United States Patent Office 3,564,036
Patented Feb. 16, 1971

3,564,036
PREPARATION OF DI-LITHIO (PERFLUORO-ALKYLETHYLSILYL) NEOCARBORANES
Cecil L. Frye, Midland, Mich., assignor to Dow Corning Corporation, Midland, Mich., a corporation of Michigan
No Drawing. Filed May 1, 1969, Ser. No. 821,146
Int. Cl. C07d 107/02; C07f 5/02, 7/08
U.S. Cl. 260—448.2      4 Claims

ABSTRACT OF THE DISCLOSURE

This invention relates to a process for the preparation of di-lithio (perfluoroalkylethylsilyl)neocarboranes by reacting dilithioneocarborane with a cyclic trisiloxane.

---

Silicon-containing organoboron polymers have gained importance because of their thermal and oxidative stability. The siloxy-carboranyl polymers are generally prepared by the ferric chloride catalyzed reaction of certain bis(halosilyl)-neocarboranes with certain bis(alkoxysilyl) neocarboranes. Disiloxanyl neocarboranes can also be reacted in this manner.

The silyl and disiloxanyl neocarborane precursors are prepared by reaction of dilithioneocarborane with halosilanes or halodisiloxanes. Examples of such preparations are disclosed in U.S. Pats. 3,388,090 and 3,397,221. These preparations rely upon the reaction of lithium and chlorine to form the $\equiv$Si—$CB_{10}H_{10}C$—S$\equiv$ bonding in the precursors to siloxy-carboranyl polymers. By the practice of the invention, there is provided another reaction route to the production of such useful intermediates.

The process of the present invention provides a method of preparing silicon-containing organoboron compounds of the formula

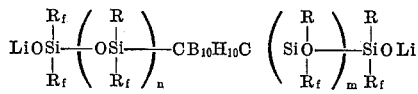

$R_f$ is a β-perfluoroalkyl radical containing from 3–12 inclusive carbon atoms;
R is an alkyl radical containing from 1–12 inclusive carbon atoms or a $R_f$ radical;
n is an integer having a value of from 0 to 3 inclusive; and
m is an integer having a value of from 0 to 3 inclusive;
comprising reacting dilithionecarborane with a cyclic trisiloxane of the formula $(RR_fSiO)_3$ in which R and $R_f$ are as defined above in the presence of an inert organic solvent.

Thus, R can be any alkyl radical, straight or branched chain, for example, ethyl, i-propyl, n-butyl, octyl or dodecyl radicals. The perfluoroalkyl moiety of $R_f$ can be —$CF_3$, $C_2F_5$, —$C_3F_3$ and so on, through the —$C_9F_{19}$ and —$C_{10}F_{21}$ radicals.

The dilithioneocarborane reactant is prepared by reacting m-carborane (i.e. neocarborane) with a lithium alkyl compound, such as n-butyllithium, by means of slow addition of the lithium alkyl to neocarborane in a suitable solvent, such as the lower dialkyl ethers. The cyclic trisiloxane starting materials are well-known compounds. The dilithioneocarborane-cyclic trisiloxane reaction proceeds at temperatures in the range of from about 0° C. to about 100° C. Generally, the reaction is carried out at from 20° C. to 30° C. The pressure employed in the reaction can be varied, although it is most convenient to utilize atmospheric pressure. It is necessary to react at least ⅔ mole of the trimer per mole of dilithioneocarborane in order to obtain the desired disubstitution. The time necessary for completion of the reaction varies with the reaction temperature. At room temperature equilibrium is attained in less than one hour.

The reaction is carried out in the presence of an inert organic solvent. Suitable solvents include dialkyl ethers, for example, diethyl ether, methyl ethyl ether, diisopropyl ether, di-n-propyl ether, ethyl-n-butyl ether, ethylene glycol dimethyl ether, dioxane and tetrahydrofuran and mixed solvents, such as diethylether-pentane, di-n-propyl ether-heptane, dioxanehexane, etc.

The products of this process are a mixture of the lithium endblocked bis(silyl)neocarboranes in which the number of siloxy units in the individual compound varies. Depending upon the molar ratio of reactants, the product will contain various proportions of compounds in which n equals 0, 1, 2 or 3 and m equals 0, 1, 2 or 3.

These lithium endblocked bis(silyl)neocarboranes are useful intermediates in the preparation of siloxy-carboranyl polymers in which the silicon atom contains a perfluoroalkylethyl substituent. The products are hydrolyzed to obtain diols which are then condensed in the presence of an acid catalyst to obtain polymeric fluids and elastomers which have utility as heat-stable fluids and sealants. The use of the products of the instant process as intermediates is illustrated in the examples.

EXAMPLE 1

A typical preparation of C,C'-dilithioneocarborane involved the addition of several grams of activated charcoal to a solution containing 1 lb. of ether and 195 g. (1.34 moles) of neocarborane. The mixture was then filtered to remove impurities. Three moles of butyllithium were added slowly with rapid stirring. After stirring for 2–3 hours at room temperature, the material was then filtered through a nitrogen-filled, fritted glass, closed funnel. The solids were washed twice with 100–200 ml. portions of hexane. The semi-dry solid was then added to 1–2 lbs. of ether which formed a slurry. The solid $LiCB_{10}H_{10}CLi$ can be exposed to or transferred to a flask through high humidity air without excessive danger of fire.

EXAMPLE 2

A dilithioneocarborane slurry was made starting with 29 grams (0.2 mole) of m-carborane. To the slurry was added 62 grams (0.13 mole) of 1,3,5-tris(3,3,3-trifluoropropyl)-1,3,5-trimethylcyclotrisiloxane dissolved in 100 milliliters of ether. The mixture was stirred for two days to obtain a mixture of compounds of the general formula

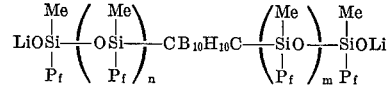

Me represents —($CH_3$) and $P_f$ represents —($CH_2CH_2CF_3$); n and m both equaling from 0 to 3.

105 grams (0.5 mole) of (3,3,3-trifluoropropyl)-methyldichlorosilane were added to the above reaction product at room temperature over a 30 minute period. The mixture was then filtered and distilled. A number of compounds were isolated having the general structure $Cl(SiP_fMeO)_nSiP_fMeCB_{10}H_{10}CP_fMeSi(OP_fMeSi)_mCl$ where n=0, m=1, (19%); n=1, m=1 (27%); n=2, m=1 (9%).

G.l.p.c. comparison analysis with known compounds also indicated the presence of compounds having the same general structure

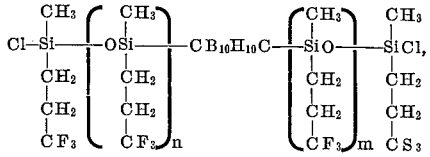

where n=0, m=0 (9%) and where n=2, m=2 (5%), in the intermediate fractions and residues. The above yields are approximations based on g.l.p.c. analysis. The overall yield was 70%. The structure, distilled yield (97% pure) and properties of the compounds isolated are listed below.

$n=1$, $m=0$; (16%).—Boiling point 150–155°/0.3 mm. Hg. The structure was confirmed by $H^1$ N.M.R. Chlorine analysis was 10.48% (theory 10.91%).

$n=1$, $m=1$; (16%).—Boiling point 160–166°/0.3 mm. Hg. The structure was confirmed by infrared and $H^1$ N.M.R. analysis. Chlorine analysis was 7.60% (theory 8.79%).

$n=1$, $m=2$; (8.5%).—Boiling point 128°/0.1 mm. Hg. The structure was confirmed by infrared and $H^1$ N.M.R. spectroscopy. Chlorine analysis was 7.44% (theory 7.37%).

EXAMPLE 3

A 20 gram (0.025 mole), portion of

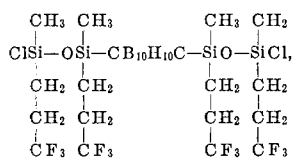

prepared as described in Example 2 was dissolved in 25 milliliters of acetone. To this was added 18 grams (1.0 mole) of water in 25 milliliters of acetone. After stirring, water and ether were added and the organic layer was washed with water until neutral. The water was removed and benzene was added and the mixture refluxed to remove the last traces of water. Evaporation of the solvents under reduced pressure left a residue product of 14.5 grams (76% yield) of the bis(hydroxydisiloxanyl)-neocarborane, which was then condensed in the presence of tetrafluorosulfonic acid to obtain a polymer of the formula

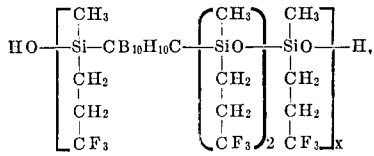

which was a highly viscous, clear fluid.

EXAMPLE 4

A C,C'-dilithiocarborane ether slurry was made by utilizing 195 grams of m-carborane in accordance with the method described in Example 1. This slurry was added to 312 grams of 3,3,3-trifluoropropylmethylsiloxane cyclic trimer which was dissolved in 150 milliliters of ether. After stirring for several hours, 360 grams (1 mole percent) of 3,3,3-trifluoropropylmethyldichlorosilane were added to the reaction mixture. The material was then filtered and hydrolyzed in water. The hydrolyzate was stripped at 225° C./0.3 mm. Hg to remove impurities and volatile material. The hydrolyzate was partially condensed during the stripping operation to give a prepolymer having the general structure:

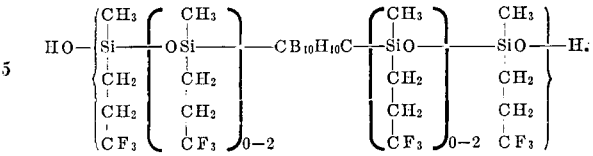

A portion of the prepolymer was mixed with a small amount of methyltriacetoxysilane and cured to an elastomer.

When a condensation catalyst, such as sulfonic acid, is added to the prepolymer and the mixture is further heated, a high molecular weight polymer of the various carborane-siloxy units is obtained.

That which is claimed is:

1. A method of preparing neocarboranes of the formula

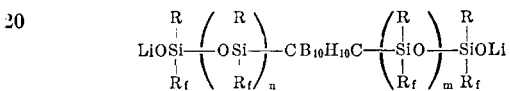

in which $R_f$ is a β-perfluoroalkyl radical containing from 3–12 inclusive carbon atoms;

R is an alkyl radical containing from 1–12 inclusive carbon atoms or a $R_f$ radical;

$n$ is an integer having a value of from 0 to 3 inclusive and $m$ is an integer having a value of from 0 to 3 inclusive;

comprising reacting dilithioneocarborane with a cyclic trisiloxane of the formula

in which R and $R_f$ are as defined above, in an inert organic solvent.

2. The method of claim 1 wherein dilithioneocarborane is reacted with $\{(CF_2CH_2CH_2)(CH_3)SiO\}_3$.

3. The method of claim 1 wherein the inert organic solvent is a dialkyl ether.

4. The method of claim 1 wherein the reaction is carried out at a temperature of from about 0° C. to about 100° C.

References Cited

UNITED STATES PATENTS

| | | | |
|---|---|---|---|
| 3,388,090 | 6/1968 | Heying et al. | 260—448.2XR |
| 3,388,093 | 6/1968 | Heying et al. | 260—448.2X |
| 3,397,221 | 8/1968 | Papetti | 260—448.2(N) |
| 3,450,739 | 6/1969 | Heying et al. | 260—448.2X |

TOBIAS E. LEVOW, Primary Examiner

P. F. SHAVER, Assistant Examiner

U.S. Cl. X.R.

260—16.5